March 7, 1967     J. PLEASANTS     3,307,683
CONVEYOR
Filed Aug. 7, 1964                                          2 Sheets-Sheet 1
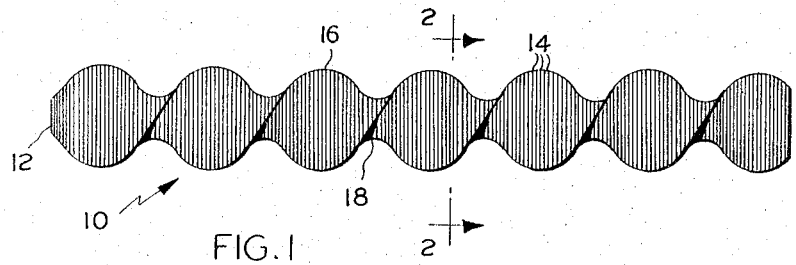
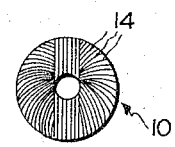
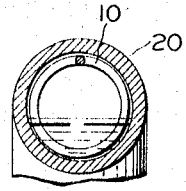
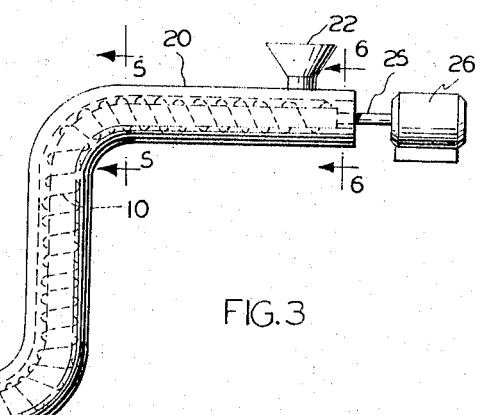
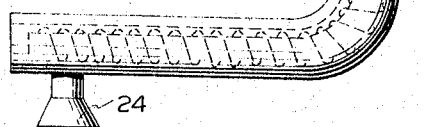
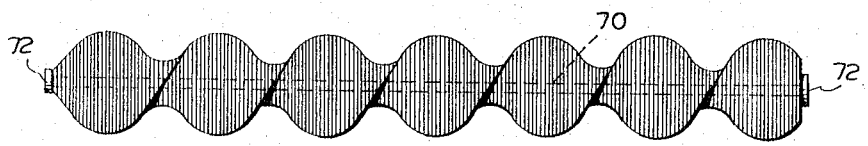
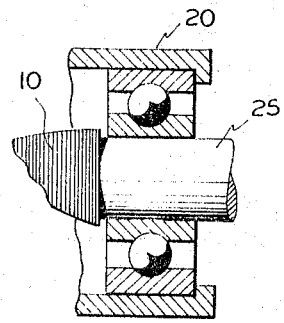
INVENTOR
JACK PLEASANTS
BY *Fidelman & Wolffe*
ATTORNEYS March 7, 1967  J. PLEASANTS  3,307,683
CONVEYOR
Filed Aug. 7, 1964  2 Sheets-Sheet 2
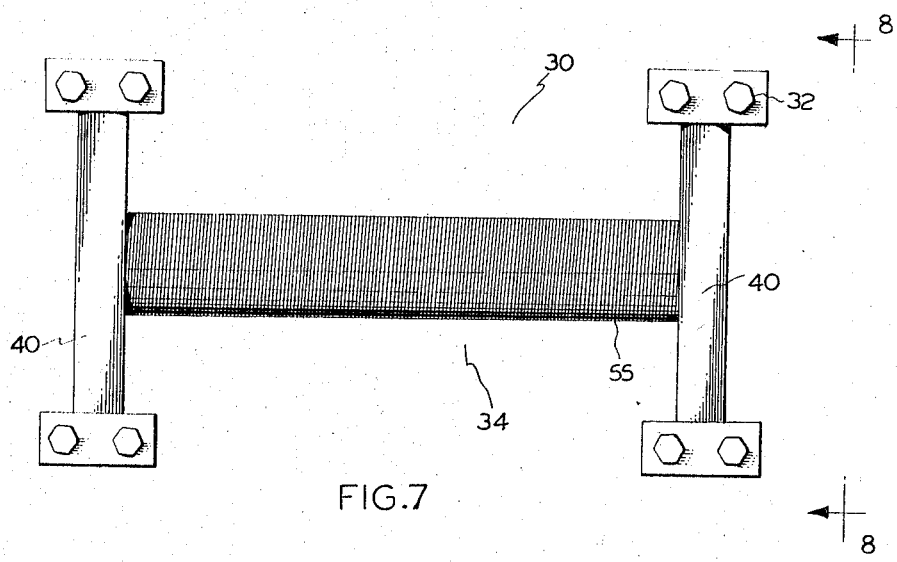
FIG.7
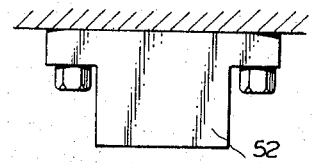
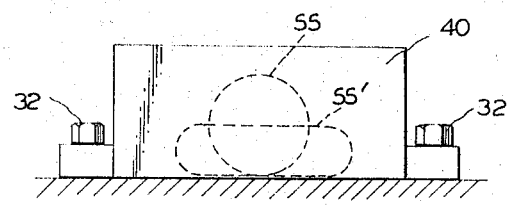
FIG.8
INVENTOR
JACK PLEASANTS
BY  *Fidelman & Wolffe*
ATTORNEYS

United States Patent Office 3,307,683
Patented Mar. 7, 1967

3,307,683
CONVEYOR
Jack Pleasants, Somerville, N.J., assignor to Nova Products, Inc., Springfield, N.J., a corporation of New Jersey
Filed Aug. 7, 1964, Ser. No. 388,156
4 Claims. (Cl. 198—213)

This invention relates to conveyors, and is more particularly concerned with a flexible conveyor of the continuous screw type adapted to convey substances along paths of varying direction.

The screw conveyor is a well-known device for transporting bulk materials from place to place and is used extensively for loading and unloading vehicles, in processing operations, in warehousing, and the like. While the conventional screw conveyor is a highly efficient and effective device, it suffers from the drawback that it is not flexible and cannot be effectively used for conveying goods around corners or along paths that are not strictly rectilinear. Various attempts to overcome this basic deficiency have been made and some success has been achieved, but prior proposals have still fallen far short of the desired goal. For example, two or more rigid rectilinear screw conveyor units have been placed in casings having rectilinear sections which are hinged together by flexible casing sections which are free from the conveyor units. Other attempts have involved the mounting of rigid conveying elements upon a flexible rope or cable. In all instances, however, there has been a sacrifice in conveying efficiency, or only limited flexibility has been provided, or complicated, damage-prone constructions have been involved, or the devices have had some limitation which has prevented them from being entirely satisfactory and from receiving any general acceptance.

It is accordingly an object of this invention to provide a flexible screw conveyor element which is fully efficient and effective, is capable of universal flexibility that permits it to convey materials in all directions and through substantially all curved paths, yet is economical to construct and to maintain.

In accordance with the invention, there is provided a screw-conveyor construction which comprises a casing which is shaped to conform to the path along which it is desired to convey; the conveying element which is adapted to be disposed inside the casing is formed from a series of closely adjacent wire coils, e.g., spring wire coils, which are shaped as a continuous screw or spiral.

The invention will be more fully described by reference to specific embodiments of practical application and to the accompanying drawing, wherein, FIG. 1 is a side elevational view of a conveying element embodying features of the present invention;

FIG. 2 is a sectional view of the conveying element, taken along the line 2—2 of FIG. 1;

FIG. 3 is a similar view of a conveyor assembly showing a casing continuing a conveying element such as shown in FIG. 1, illustrating the manner in which the element freely follows the curvature of the casing;

FIG. 4 is a side elevational view of a conveying element such as shown in FIG. 1, but showing it in combination with an axial rod and end retaining means;

FIG. 5 is a section taken along 5—5 of FIG. 3;

FIG. 6 is an enlarged section taken along 6—6 of FIG. 3;

FIG. 7 is a somewhat diagrammatic view of an apparatus for making a spiral flexible conveying element of the type shown in FIG. 1; and FIG. 8 is a diagrammatic view of the apparatus of FIG. 7 as seen from the right-hand side of FIG. 7.

Referring now to the drawing, and more particularly to FIGS. 1 to 4, the flexible screw conveyor element 10 of the invention is defined by a flattened coil spring 12 in which the continuous series of closely disposed coils 14 of wire are laterally shifted relatively to one another as they progress from one end of the element to the other to form a continuous spiral having crests 16 and hollows 18. The conveying element can be of any desired length and, if desired, the wire ends of the conveying element can be joined to the wire ends of like elements, if a conveyor is desired which is to have a length greater than can be conveniently made from a single length of wire. Such joining of the wire ends can be effected by soldering, welding, or other conventional joining means so that the continuity of the element is not interrupted.

The wire forming the conveying element is wire of the type known as spring wire and is of a diameter which has sufficient flexibility for the particular intended use. Spring wire typically used in the construction of flexible conveying elements in accordance with this invention has a diameter of .0156″ to .75″.

Referring now to FIG. 3, a casing 20 is provided to enclose the conveying element 10, and to provide a feed inlet 22 for the material to be conveyed and an outlet 24. The casing is shaped to conform to the path along which the material being handled is to be conveyed, e.g., an arc of any radius, a sinuous path, a path with rectilinear stretches joined by right-angle corners, an S-shaped path, and the like. It is a feature of the conveyor of the invention that it can accommodate itself to any path. The casing 20 can be formed of a rigid material, such as metal, glass, a rigid plastic, such as an acrylate resin, or the like, or it can be relatively flexible and formed from rubber, e.g., reinforced mechanical rubber, neoprene, or other synthetic elastomer, polyethylene, polyvinylchloride, or other synthetic plastic, and the like. The casing can also be fomed from a coil spring of circular cross-section, but if liquids, or articles of small particle size are to be conveyed, it will be necessary to enclose the casing in a flexible sheath, e.g., a rubber sheath, in order to make it fluid tight. The conveying element 10 can also be coated, e.g., with a synthetic elastomer or synthetic plastic in order to make it corrosion resistant, if the metal itself is not sufficiently corrosion resistant, or in order to fill the spaces between adjoining coils.

Once the conveying element 10 is mounted in the casing 20, it is actuated merely by rotating it. By reason of its construction, the element turns freely in the casing, even in the curved portions of the casing, and will convey materials from one end of the casing to the other, the direction of conveying being, of course, controlled by the direction of rotation of the element, as in a conventional screw conveyor. To rotate the conveying element 10, any conventional means can be used. Thus, the end of the element can be directly connected to the shaft 25 of a motor 26, as shown in FIG. 3 and FIG. 6. Alternatively, the conveying element can be connected to a pulley (not shown) adapted to be driven by a motor or engine over a belt. Of course, the element can be operated manually, e.g., by the provision of a crank (not shown) at its end.

The conveying element 10 can be made in any convenient manner by suitably coiling the spring wire. However, I have found that the spiral element of my screw conveyor can be made quickly and efficiently by flattening a conventional circular coil spring, as in a hydraulic press. Thus, referring to FIGS. 7 and 8, there is shown the lower platen 30 of a hydraulic press on which are mounted, and secured to the platen 30, as by screws 32, two end walls 40 which define a die cavity 34. The upper platen 50 of the hydraulic press has secured to it a die or press member 52 which is adapted to be received in the cavity 34.

The hydraulic press is operated to move the die member 52 into and out of the cavity 34 in a conventional manner by conventional means (not shown). When a conveying element 10 is to be formed, a conventional coil spring 55 of circular cross-section and formed from a wire of the desired size is disposed in the cavity 34 with its ends against walls 40, as seen in FIG. 7, the circular cross-section of the spring being evident from the dash lines seen in FIG. 8. The upper platen 50 is then lowered to cause the die member 52 to enter the cavity 34 and to engage the spring 55 and to compress it to a flattened form 55', as shown by dotted lines in FIG. 8. The die member is lowered and stopped when the vertical dimension of the spring 55 has been reduced to about 60% of the original value. Surprisingly, when the pressure on the spring is now released, as by withdrawal of the die member 52 from the cavity 34, the compressed spring assumes the spiral configuration shown in FIG. 1. The conveying element 10 is then ready to be assembled into a suitable casing and to be connected to appropriate means to rotate it.

In a typical case, a flexible conveying element for the conveying of granular material is constructed from a coil spring 16 feet long, formed from steel or alloy wire of a diameter of .75", the spring coil having an external diameter of 8". The spring is compressed in a hydraulic press under a pressure of 400 tons to reduce its external vertical dimension from 8" to 4.8" and to increase its external horizontal dimension from 8" to 10.30". When the pressure is released, the flattened spring forms a spiral having a pitch of 20". This spiral conveying element is then inserted into a casing formed of steel or alloy and having an internal diameter of 10.50". If the spring coil is not supported in a bar it lies in the bottom of the conveyor.

The invention is, however, in no way limited to a screw conveyor of the size exemplified and conveying elements of larger or smaller sizes can be similarly provided. For most purposes, screw conveying elements having external diameters of 10 to 12", and pitches of 20 to 24" are suitable.

In some cases, as where relatively heavy materials are to be conveyed, it may be desirable to strengthen the conveying element. This can be readily effected, as shown in FIG. 4, by inserting a flexible rod 70 along the axis of the element 10 and fastening the ends of the rod to the ends of the element 10, as by end plates 72. It will also be apparent that the method of this invention can be used to make conveying elements for conventional rectilinear applications where a flexible conveyor is not needed or desired. For this purpose, the element is formed from a coil spring, as previously described, but a rigid rod is then inserted along its axis and fastened to its ends as shown in FIG. 4.

The conveying element above described can also employed most advantageously as a tube cleaner, e.g. for heat exchangers, plumbing, etc., when pre-existing tubular members provide the casing structure. A properly sized conveying element can scour the tube and at the same time convey the detritus out of the tube.

Other changes and modifications will be readily apparent to those skilled in the art and it is intended, therefore, that all matter contained in the foregoing description and in the drawings shall be interpreted as illustrative only and not as limitative of the invention.

What is claimed is:
1. A conveyor comprising:
   an enclosed casing;
   a spiral shaped conveying element disposed in the casing, said conveying element being a flattened coil spring wherein adjacent coils are angularly offset the spring as a whole being formed in the shape of a spiral;
   and means to impart rotary motion to said conveying element to advance material through the casing.
2. The conveyor of claim 1 wherein support means are provided to support said conveyor element at the ends thereof.
3. The conveyor of claim 1 wherein a reinforcing rod is axially disposed in the flattened coil spring and secured thereto at the ends thereof.
4. The conveyor of claim 1 wherein a reinforcing rod is axially disposed in the flattened coil spring and secured thereto at the ends thereof, and where support means are provided to said conveyor element at the ends thereof.

References Cited by the Examiner

UNITED STATES PATENTS

| | | | |
|---|---|---|---|
| 421,999 | 2/1890 | Williams | 198—213 |
| 2,869,715 | 1/1959 | Williams | 198—64 |
| 3,219,178 | 11/1965 | Mayrath | 198—213 |

FOREIGN PATENTS 1,310,620  10/1962  France.

EVON C. BLUNK, *Primary Examiner.*

RICHARD E. AEGERTER, *Examiner.*